(No Model.)
J. HAMMOND.
RAILWAY CAR.
No. 474,736. Patented May 10, 1892.
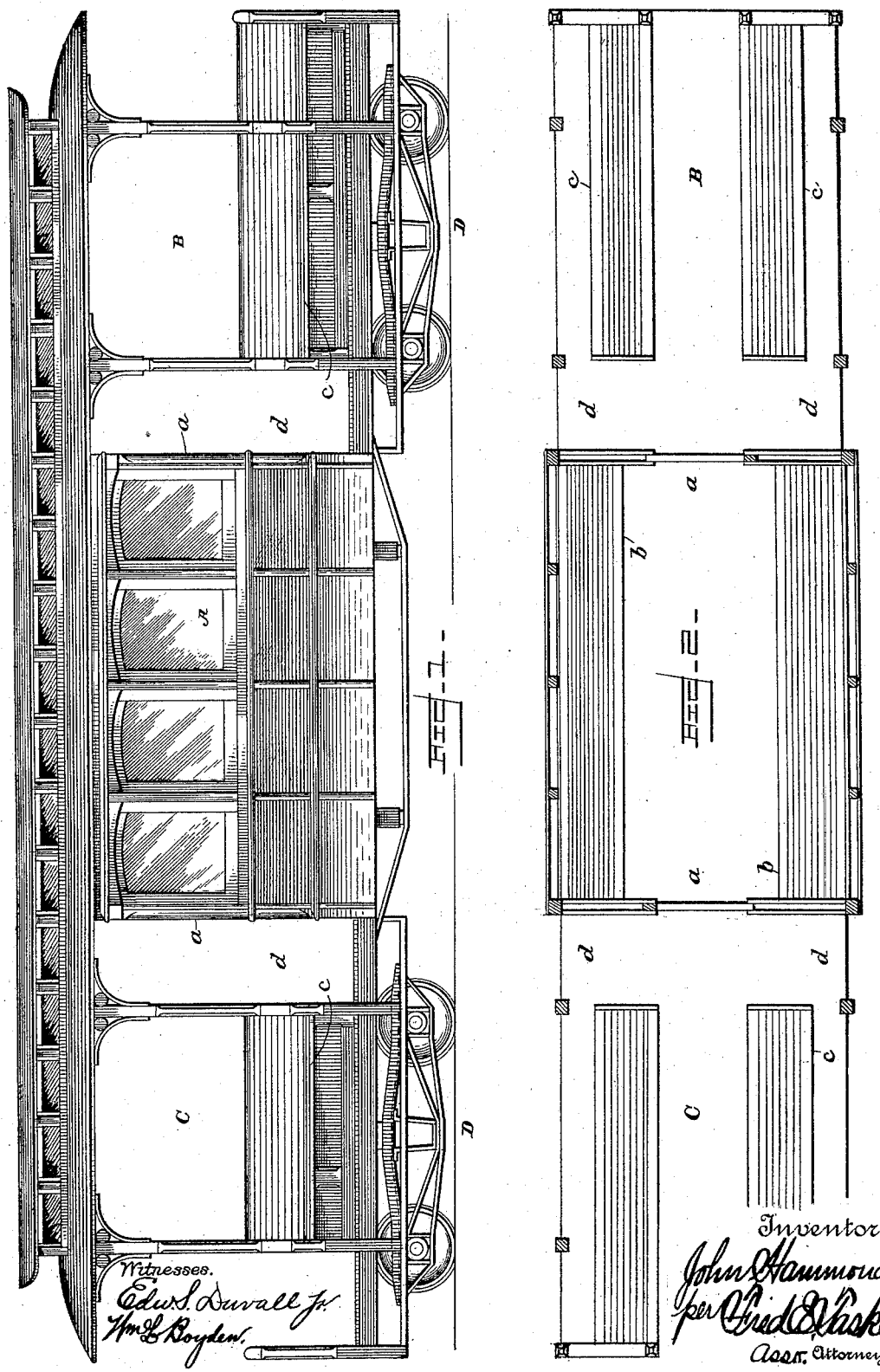

UNITED STATES PATENT OFFICE.

JOHN HAMMOND, OF SAN FRANCISCO, CALIFORNIA.

RAILWAY-CAR.

SPECIFICATION forming part of Letters Patent No. 474,736, dated May 10, 1892.

Application filed February 4, 1892. Serial No. 420,255. (No model.)

*To all whom it may concern:*

Be it known that I, JOHN HAMMOND, a citizen of the United States, residing at San Francisco, in the county of San Francisco and State of California, have invented a new and useful Cable-Railway Car, of which the following is a specification.

My invention relates to improvements in cable-railway cars in which the grip or motor car is attached permanently to the passenger-car, and generally known as "combination-cars;" and the object of my invention is to construct a cable-railway car of the combination type which will allow the cable-gripping apparatus to be worked from both ends of the car, rendering the car equally adapted for running in either direction. I attain this object by the construction illustrated in the accompanying drawings, in which—

Figure 1 is an elevation of the car, and Fig. 2 is a plan view of the same.

Similar letters refer to similar parts throughout the two views.

The car is built with three compartments A, B, and C, the middle compartment A being closed on the sides by windows in the usual manner, and having a sliding door $a\ a$ at each end, and a seat $b\ b$, running lengthwise on each side of the car. The end compartments B and C are of open construction, being without windows or doors, and are provided with seats $c\ c$, running lengthwise of the car, as shown, and are placed back to back, with a sufficient space between the backs for working the cable-gripping mechanism described in my application for Letters Patent filed December 12, 1891, No. 414,874. The entrances to compartment A are open at all times to the street by passages $d\ d\ d\ d$.

A swinging truck D D is placed under each end of the car, as shown. These trucks are constructed of four wheels each and are known as the "bogie" style of truck.

The symmetrical construction of this car adapts it for running in either direction and greatly facilitates the handling at the terminus of the roadway, as the car is not turned around at this place; but by making a simple change in the gripping mechanism it is ready to commence the return trip. The open construction of the end compartments allows the gripman to have an unobstructed view ahead and on the sides. It will thus be seen that my car will run in either direction with equal facility. The appearance and construction of the car is the same at each end, being in fact a double combination-car.

Having fully described my invention, what I claim, and desire to secure by Letters Patent, is—

1. A railway-car constructed with three compartments, the middle compartment being inclosed by windows on both sides and having a door at each end, and suitable adjoining entrances or passages, whereby the said middle compartment is readily accessible from the street, and the end compartments of the car being of open construction and consisting, simply, of the car-roof and its supports, said car being provided with a central aisle running the whole length of both open and closed compartments between the sides therein, substantially as described.

2. A cable-railway car constructed of three compartments, the middle compartment A being closed and provided on its sides with windows and at each end with a sliding door $a$, and also with the interior seats $b\ b$, running lengthwise on each side of the car, there being adjacent to the said sliding doors transverse passages $d\ d$, by which access is had to said doors from the street, and the end compartments B and C being of open construction, without windows or doors, and consisting, simply, of the overhead roof and suitable supporting uprights, and said open compartments being provided with seats $c\ c$, running lengthwise of the car and placed back to back, with a sufficient space between their backs for the working of the cable-gripping mechanism, substantially as described.

In testimony whereof I have hereunto affixed my signature in the presence of two witnesses.

JOHN HAMMOND.

Witnesses:
 JAMES L. KING,
 W. N. KEMPSTON.